United States Patent [19]
Pirkle

[11] Patent Number: 4,717,112
[45] Date of Patent: Jan. 5, 1988

[54] COMPUTER WORKSTATION

[76] Inventor: Fred L. Pirkle, P.O. Box 27, Oreland, Pa. 19075

[21] Appl. No.: 927,242

[22] Filed: Nov. 4, 1986

[51] Int. Cl.$^4$ ............................................. F16M 13/00
[52] U.S. Cl. ........................................ 248/639; 108/5; 108/140; 108/143; 248/157; 248/349; 248/676
[58] Field of Search ............... 248/371, 1 B, 1 A, 157, 248/349, 558, 637, 639, 676, 678, 1 C, 1 E; 312/7.2, 208; 108/140, 143, 5, 6

[56] References Cited

U.S. PATENT DOCUMENTS

| | | | |
|---|---|---|---|
| 3,128,573 | 4/1964 | Johnson et al. | 108/6 X |
| 3,847,461 | 11/1974 | Moeckl | 312/281 |
| 4,068,908 | 1/1978 | Horn | 312/30 |
| 4,313,112 | 1/1982 | Foster | 340/700 |
| 4,316,082 | 2/1982 | Fritz | 235/146 |
| 4,379,429 | 4/1983 | Gubbe et al. | 108/5 |
| 4,428,631 | 1/1984 | Cope et al. | 312/194 |
| 4,441,432 | 4/1984 | Carlton | 108/5 |
| 4,483,572 | 11/1984 | Story | 248/1 B |
| 4,496,200 | 1/1985 | Hagstrom et al. | 312/208 |
| 4,515,086 | 5/1985 | Kwiecinski et al. | 108/143 X |
| 4,560,132 | 12/1985 | Wilder | 248/1 C |
| 4,561,619 | 12/1985 | Robillard et al. | 248/285 |
| 4,620,489 | 11/1986 | Albano | 108/143 X |
| 4,635,893 | 1/1987 | Nelson | 248/558 |

FOREIGN PATENT DOCUMENTS 2847135 10/1978 Fed. Rep. of Germany .

OTHER PUBLICATIONS

Grolen, Incorporated Brochure "The Ulta-Mate", Sep., 1985.
Global Computer Supplies Catalog, 1986, pp. 2, 64, 70.
Devoke Data Products, Catalog Q, 2/83, 1500 Martin Ave., Santa Clara, Calif., p. 7.
Inmac Catalog, 39th B Ed., Aug. 1984.

*Primary Examiner*—J. Franklin Foss
*Assistant Examiner*—David L. Talbott
*Attorney, Agent, or Firm*—Howson and Howson

[57] ABSTRACT

A workstation for computer-aided design comprises an L-shaped main support frame having a monitor support panel which is both tiltable and slidable fore and aft. Connected between the horizontal elements of the L-shaped support frame is a secondary support frame carrying a digitizer support and a keyboard support. The keyboard support is forward and below the level of the digitizer support. The digitizer support is slidable fore and aft on the secondary frame, and the secondary frame itself is slidable fore and aft, and forwardly tiltable, relative to the main support frame. The main support frame rests on nylon feet, which are slidable on a table top. A centrally located foam pad is connected to the main support frame through a swivel mechanism, and is in compression and in frictional engagement with the table top, so that the workstation can be swivelled about a vertical axis, but translational movement is prevented.

7 Claims, 9 Drawing Figures

COMPUTER WORKSTATION

BRIEF SUMMARY OF THE INVENTION

This invention relates to computer workstations, and particularly to a workstation which, while having more general applicability, is particularly adapted for use in computer-aided design (CAD), which as used herein, should be understood as including computer-aided design and drafting (CADD).

Computer-aided design can be carried out using a large computer mainframe, a minicomputer or a microcomputer. The principal components of a CAD workstation include a video display monitor, a keyboard for data entry and control, and a digitizing pad, which is also used for entry of data and control information into the computer.

In prior CAD workstations, the keyboard and digitizing pad were typically placed side-by-side or one behind the other. If one of these two elements was at an optimum location for operator convenience, the other was usually at an inconvenient location. For example, if the keyboard and digitizing pad were arranged side-by-side, with the digitizing pad directly in front of the operator, the keyboard would be at ta position at which "touch" typing was impossible. Touch typing was likewise impossible, or at least extremely difficult, when the keyboard was positioned behind the digitizing pad. If the keyboard was in front of the digitizing pad, touch typing was possible, but the digitzing pad was somewhat hard to reach, and its indicia were more difficult to see. In each case in which one element was behind the other, the monitor was either positioned to the side, requiring movement of the operator's head to shift from the digitizing pad to the monitor screen, or positioned directly behind the keyboard and digitizing pad, in which case the monitor was too far away from the operator's eyes for proper viewing of details on its screen.

In addition to the foregoing problems, prior workstations did not have the flexibility to adapt to all of the various working conditions encountered in computer-aided design. For example, whereas in word processing and other conventional computer applications, the operator is normally seated at all times, a CAD operator may sometimes find it necessary to move back and forth repeatedly from the CAD workstation to another location. CAD equipment is usually so expensive that many CAD workstations are shared by different operators of different physical sizes. The optimum viewing distances may also differ considerably from one operator to another. Prior CAD workstations have not been capable of adaptation to these varying conditions.

The principal object of the invention is to provide an improved workstation for computer-aided design in which all parts are located at, or movable to, convenient and ergonomically optimum locations. It is also an object of the invention to provide a CAD workstation which is sufficiently flexible to accommodate various different conditions encountered in CAD operation. It is also an object of the invention to provide a CAD workstation which is simple, inexpensive and easy to assemble. Another object is to provide a CAD workstation which is light in weight, yet sufficiently strong to support heavy monitors and other CAD equipment. It is also an object of the invention to provide a CAD workstation which can be stored and shipped in knocked-down condition in a very small package. Still another object is to provide for easy adjustability of the workstation to accommodate different operators and different working conditions. A still further object of the invention is to provide a workstation which, while primarily intended for computer-aided design, is useful in word processing, and other computer applications. Still anothe object is to provide an adjustable workstation which is reducible to a compact condition when assembled. Still further objcts and advantages of the invention will be appparent from the detailed description below.

The workstation of the invention comprises a main support frame, a monitor support, and means for connecting the monitor support to the main support frame. The connecting means both allows and limits adjustment of the position of the monitor support relative ot the main support frame in fore and aft directions. The monitor support is also preferably tiltable both forwardly and rearwardly to provide for optimum viewing by the operator in the seated and standing positions.

The workstation also includes a digitizer support having a pad supporting surface and a keyboard support having a keyboard supporting surface. The digitizer support and the keyboard support connected together by a secondary frame with the keyboard supporting surface below the level of the lowermost part of the digitizer supporting surface. The secondary frame is connected to the main support frame by means allowing and limiting adjustment of the secondary frame relative to the main support frame in fore and aft directions and allowing and limiting tilting of the secondary frame about a horizontal axis perpendicular to the fore and aft directions.

The digitizer support and keyboard support are relatively movable in the fore and aft directions, preferably to the extent that the keyboard can be stowed completely underneath the digitizing pad when not needed, or completely exposed when used extensively.

The main support frame preferably rests in part on a compressible foam pad, with swivel means connecting the pad to the frame. The frame also has a plurality of feet with hard surface which are capable of gliding on a table top. The pad is positioned so that it is in compression, and in frictional engagement with the table top, when the feet are in engagement with the table top. The workstation is prevented by friction from translational sliding while it is at the same time capable of swivelling movement for operator convenience. The secondary frame is tiltable and cut-away so that the keyboard support can move from a condition in which it is at least as high as the table top to a condition in which it is below the plane of the table top.

DETAILED DESCRIPTION

Figure 1:
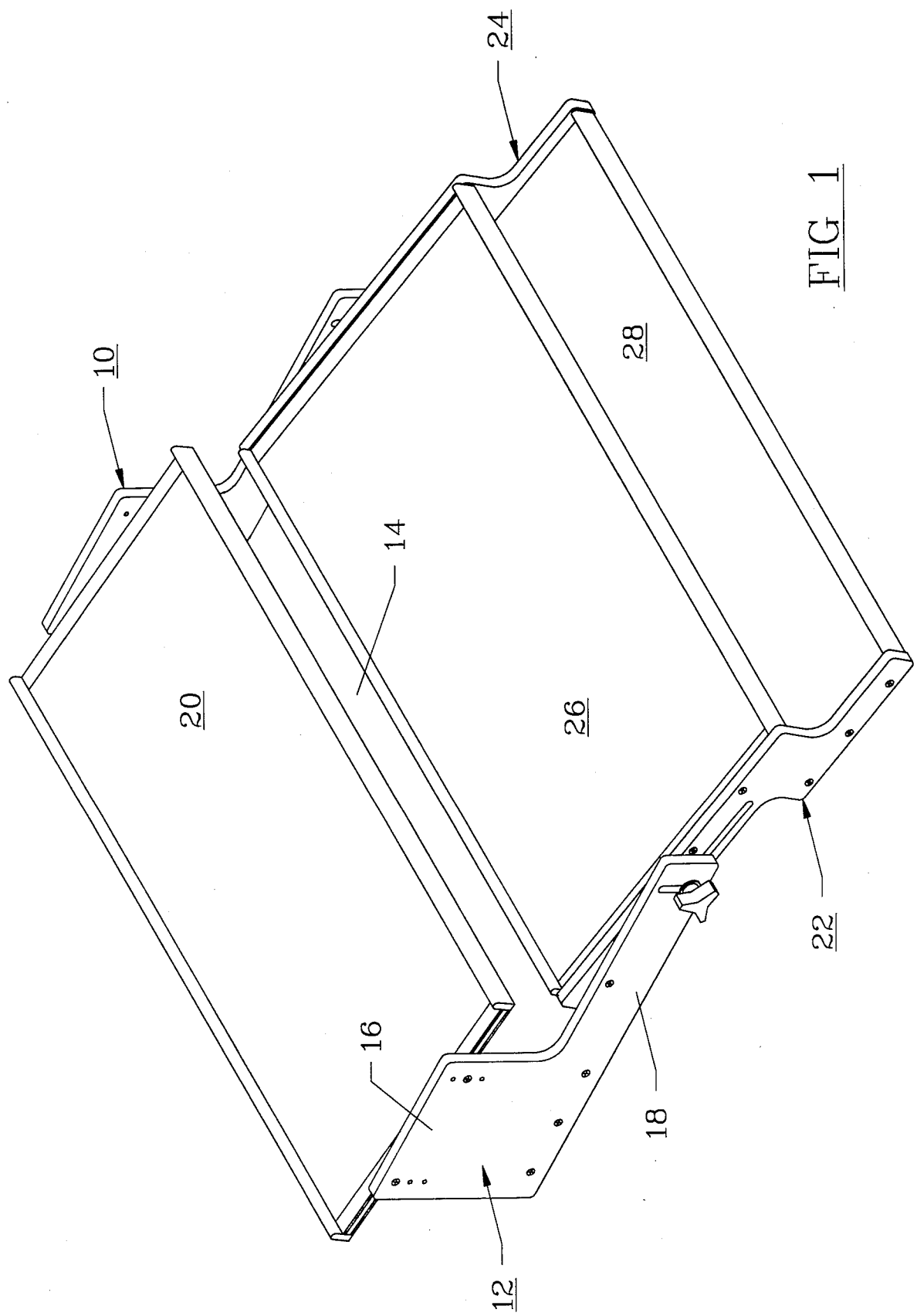
FIG. 1 is a perspective view of a workstation in accordance with the invention.

As shown in FIG. 1, the main support frame comprises a pair of side panels 10 and 12 in opposed, spaced relationship, with a bottom panel 14 connected between them near their lower edges. SIde panel 12 is L-shaped, having a vertical leg 16 and a horizontal leg 18 extending forwardly from the lower end of the vertical leg. Side panel 10 is similar. A monitor support 20, having a generally planar upper surface, is connected to both side panels near the upper ends of the vertical legs. A secondary frame comprises panels 22 and 24, which are in opposed, spaced relationship. Panel 22 extends into the space between the horizontal legs of panels 10 and 12 and is adjacent and connected to panel 12. Panel 24 extends into the same space, and is adjacent and connected to panel 10. A digitizing pad support 26, having a planar supporting surface, adn a keyboard support 28 extend between the side panels of the secondary frame and are connected to the side panels in such a way that the keyboard support 28 is located below the plane of the digitizing pad supporting surface.

Figure 2:
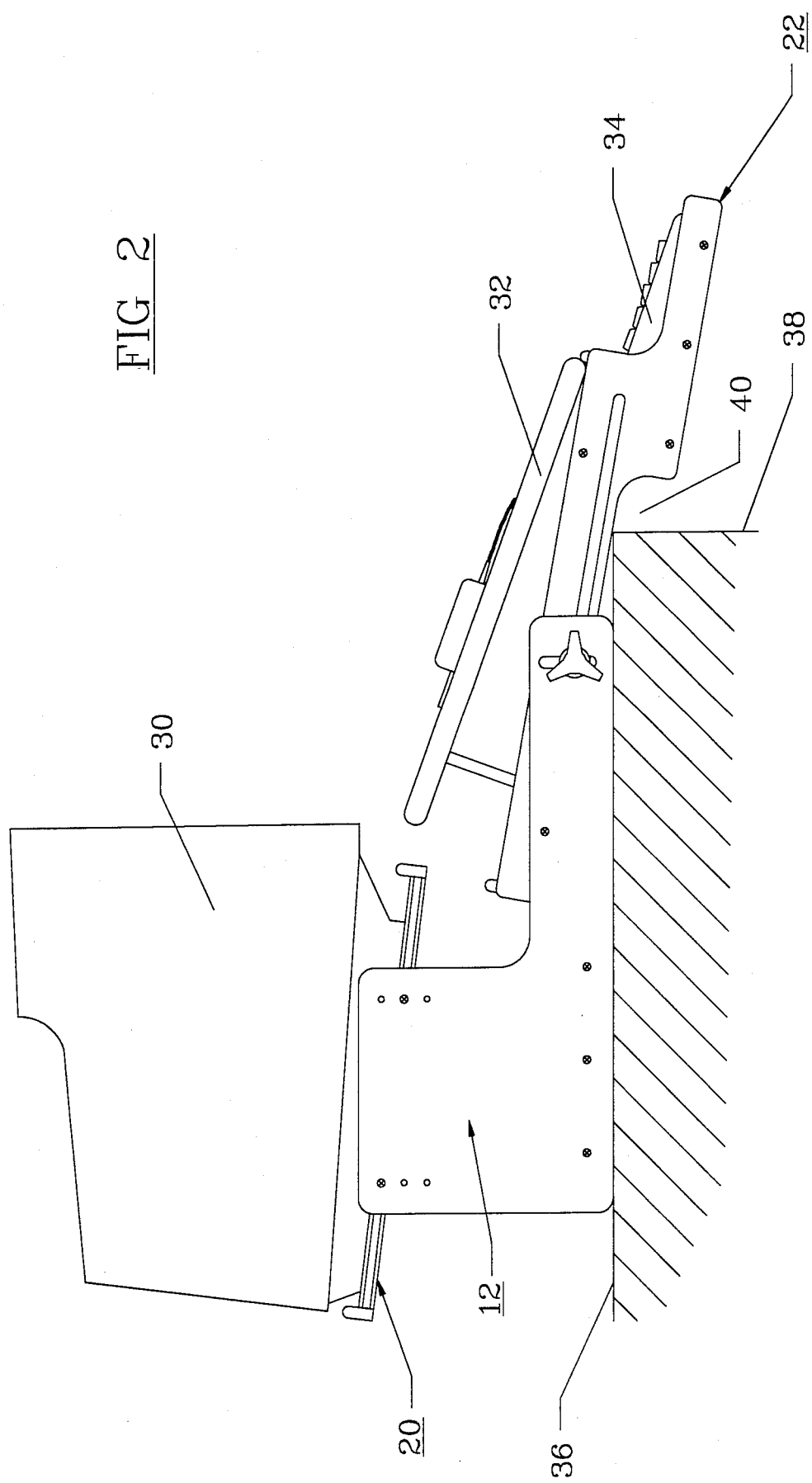
FIG. 2 is a side elevation of the workstation, showing a monitor, keyboard and digitizing pad in place.

As shown in FIG. 2, a monitor 30 is located on support 20, which is tilted forward. A digitizing pad 32 is located on the digitizer pad support, and keyboard 34 is located on the keyboard support. The secondary frame is also shown tilted forwardly so that the keyboard is below surface 36 of the table on which the main frame rests. The keyboard is in front of the front edge 38 of the table, and the side panels 22 and 24 of the secondary frame are cut away at 40 to provide a clearance allowing forward tilting of the secondary frame.

The digitizing pad support 26 can be used for purposes other than to hold a digitizing pad. For example, it can be used to support a second keyboard, or it can hold books and other references. Thus, the digitizing pad support can be particularly useful in PC publishing.

The L-shaped side panels 10 and 12 make it possible for support 26 to hold a digitizing pad which is wider than the distance between the side panels. The L-shape also provides easier access to the upper parts of the digitizing pad.

The workstation is symmetrical. Therefore, it should be understood that the details of the right side, which are not shown, are similar to the details of the left side, which are shown in FIGS. 3 and 4.

Figure 3:
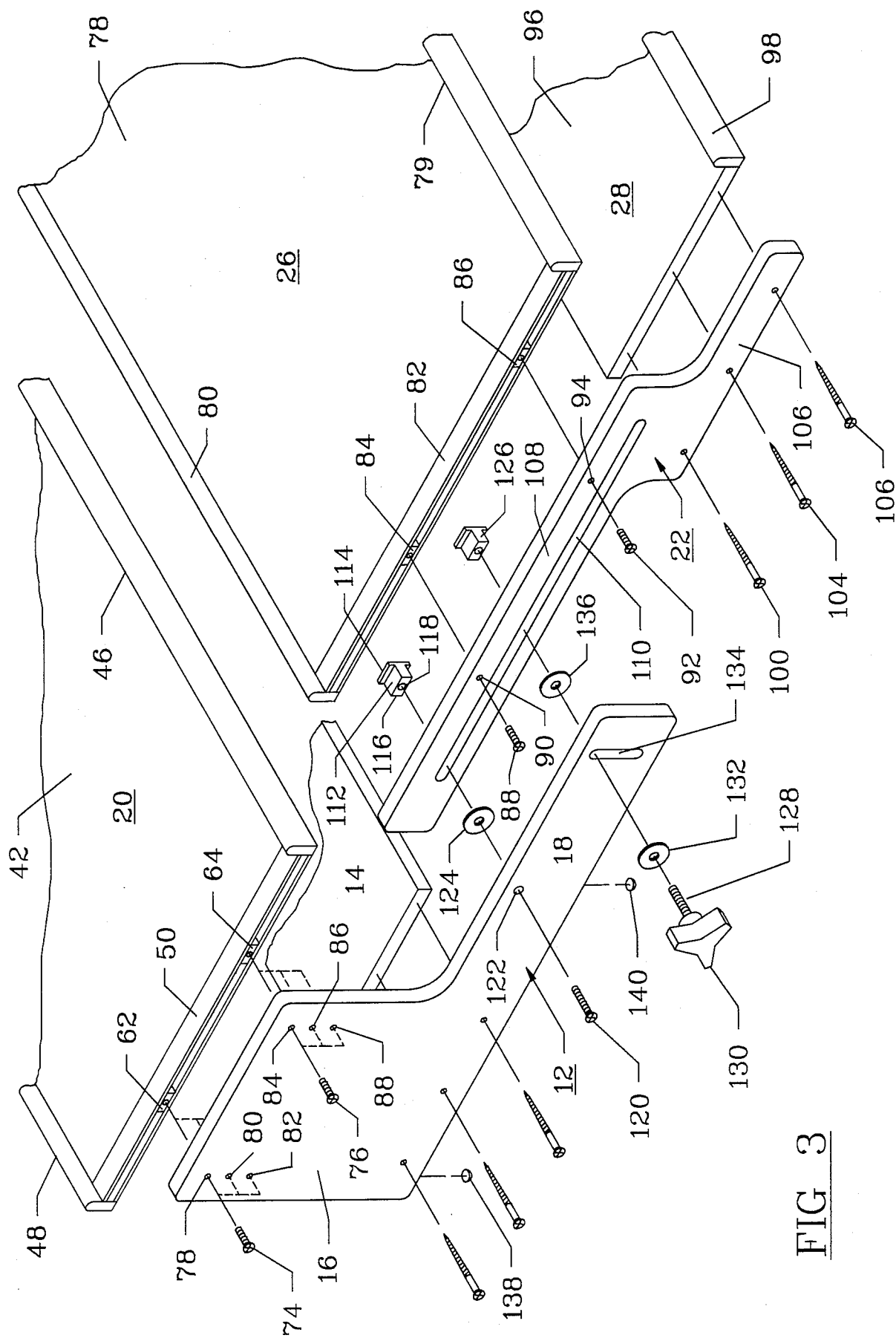
FIG. 3 is a fragmentary exploded perspective view of the workstation, illustrating the manner in which the main and secondary frames, monitor support, digitizer support and keyboard support are connected together.

As seen in FIG. 3, monitor support 20 comprises a panel 42 having a substantially planar top surface, a front edge trim strip 46, and a rear edge trim strip 48. The front edge trim strip is secured to panel 42 by screws, including screws 52 and 54, shown in FIG. 4. The rear edge trim strip is similarly attached.

Figure 4:
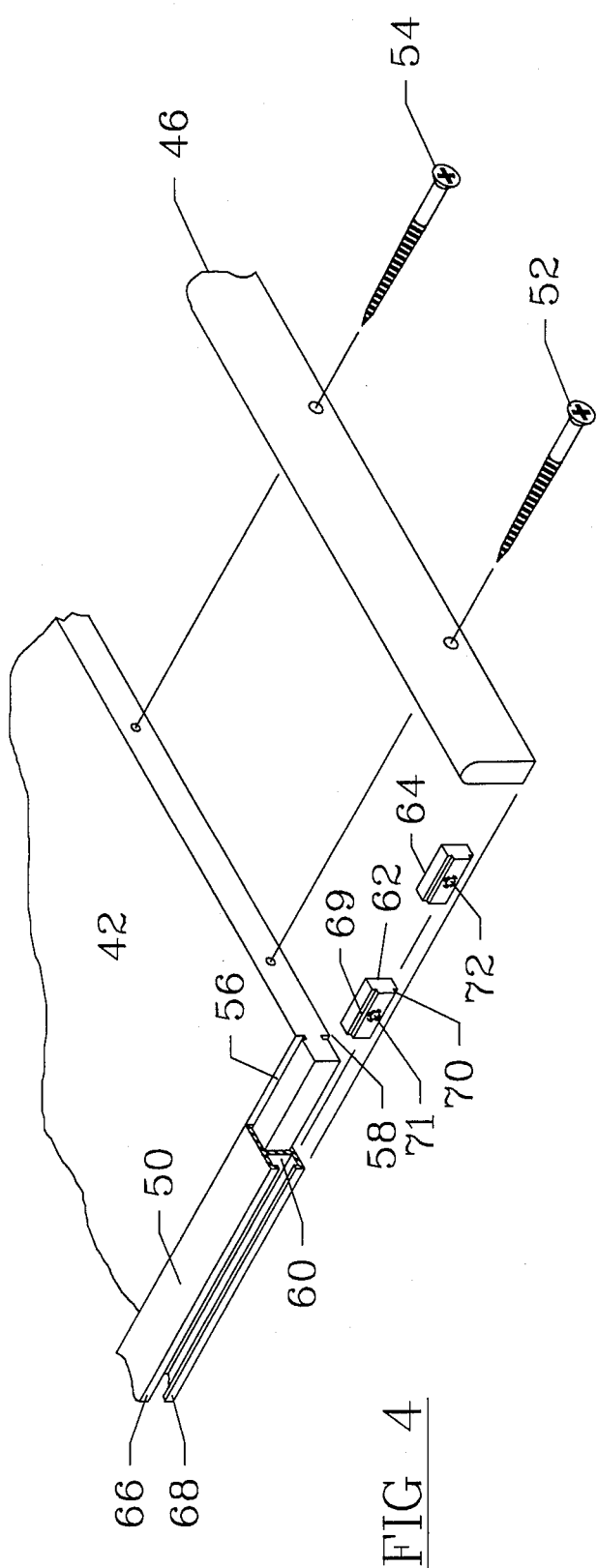
FIG. 4 is a fragmentary exploded perspective view showing construction details of the monitor support.

FIG. 4 shows, in greater detail, an aluminum extrusion 50 which extends along the left edge of panel 42. The extrusion is retained by grooves 56 and 58 respectively in the upper and lower faces of panel 42, and is prevented from sliding in the grooves by front and rear trim strips 46 and 48. An outwardly facing channel 60 of the extrusion receives aluminum slides 62 and 64, which are slidably retained in the channel by vertical flanges 66 and 68. These slides have recesses at their upper and lower edges, the recesses in slide 62 being indicated at 60 and 70. The horizontal depth of these recesses is less than the thickness of flanges 66 and 68. The slides also have holes 71 and 72, which are tapped to receive screws 74 and 76, seen in FIG. 3. Through holes 78, 80 and 82 are provided in a vertical column near the upper end of the rear edge of leg 16 of panel 12. A similar column of holes 84, 86 and 88 is provided near the upper end of the front edge.

By selecting appropriate holes for screws 74 and 76 and their counterparts on the opposite side of the main support frame, the monitor support panel can be positioned ar various heights, and can be made to sit horizontally or to tilt forwardly or rearwardly at any desired one of several possible angles. For a greater selection of tilt angles, the spacing of the holes in the forward columns can be made different from the spacing of the holes in the rear columns.

By loosening screws 74 and 76 and their counterparts, the monitor support is allowed to slide forwardly or rearwardly. When the screws are tightened flanges of the extrusion are clamped between the side panels and the recessed surfaces of the slides on which the extrusions travel. This prevents forward and rearward sliding of the monitor support.

Referring to FIG. 3, the digitizing pad support comprises a panel 78 having a substantially planar top surface with edge trim strips 79 and 80 respectively at its front and rear edges. The side edges of the digitizing pad support panels have aluminum extrusions substantially identical to extrusion 50, one such extrusion being indicated at 82. Slides 84 and 86, similar to slides 62 and 64, are located in an outwardly facing channel of extrusion 82. Slide 84 receives screw 88, which extends through hole 90 in side panel 22 of the secondary frame. Slide 86 similarly receives screw 92, which extends through hole 94. When the screws are tightened, the digitizing pad support is held immovably with respect to the side panels of the secondary frame. However, when the screws are loosened, the digitzing pad support can slide relative to the secondary frame in a fore and aft direction.

The monitor support and digitizing pad support, and their associated hardware can be substantially identical. Preferably, however, the digitizing pad support is somewhat deeper in the fore and aft direction than is the monitor support. The aluminum extrusions on the sides of the monitor and digitizing pad supports, and the front and rear edge trim strips serve as reinforcing beams and add strength to the supports. Therefore, panels 42 and 78 can be relatively light in weight.

The keyboard support 28 comprises a panel 96 having a front edge trim strip 98. It is secured to side panel 22 of the secondary frame by screws 100, 102 and 104, which extend through holes in front section 106 of panel 22.

Rear section 108 of panel 22 has an elongated slot 110 extending in the fore and aft direction. This slot receives two T-shaped slides 112 and 126. Slide 112 comprises a flanged section 114, which is higher than the vertical width of slot 110, and a main body 116, which extends laterally outwardly from the flanged section by a distance slightly less than the thickness of side panel 22, so that it does not extend all the way through slot 110. Hole 118 in body 116 is tapped to receive screw 120, which extends through hole 122 in leg 118 of the main support frame, and through washer 124, which is situated between leg 18 and rear section 108 of panel 22. Preferably, screw 120 and its counterpart on the opposite side of the workstation are not tightened. However they can be secured to their respective T-shaped slides by a suitable thread locking compound. Therefore, the scondary frame members can slide fore and aft on the rear T-shaped slides.

Forward T-shaped slide 126 receives threaded shaft 128 of a tightening knob 130, the shaft extending through washing 132, a vertical slot 134 in leg 18, and washer 136. Slot 134 allows the secondary frame to pivot about a horizontal axis aligned with screw 120, when knob 130 is loosened. When knob 130 and its counterpart on the opposite side of the main support frame) are loosened, the secondary frame can be both tilted and moved fore and aft.

Figure 5:
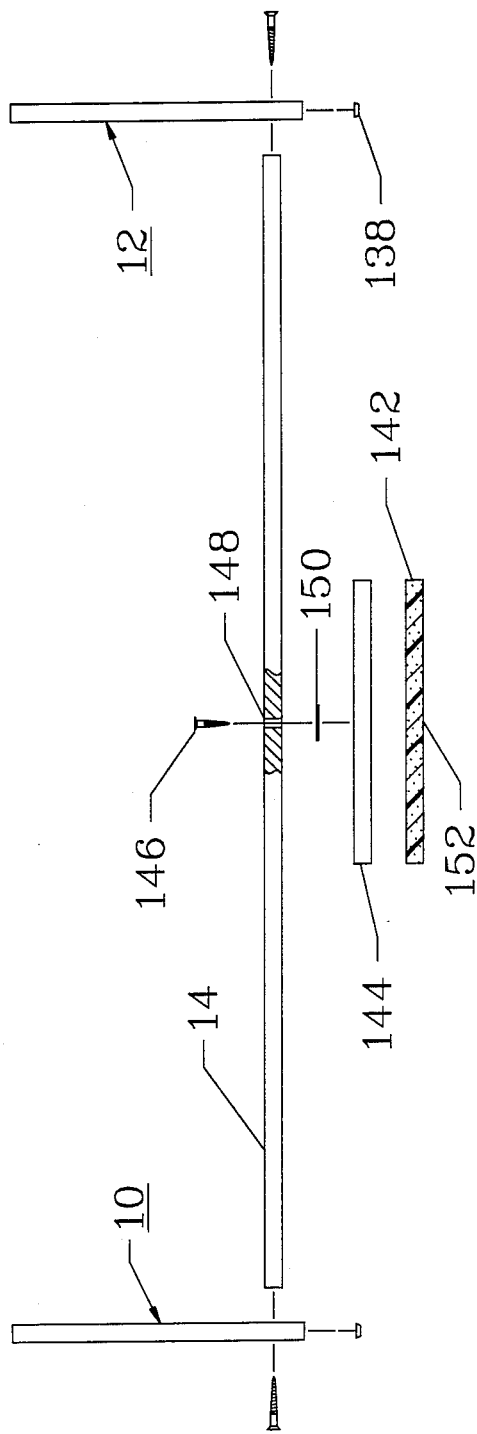
FIG. 5 is a fragmentary rear elevational view, partially in section, illustrating the compressible base pad and the swivel means by which it is connected to the main support frame of the workstation.

FIG. 3 also shows a pair of feet 138 and 140, which are to be secured to the bottom edge of side panel 12. Opposite side panel 10 has similar feet. All of these feet are made from a hard material such as nylon, adapted to glide on a table top. Their hard bottom surfaces are coplanar. A compressible foam rubber pad 142, shown in FIG. 5, is adhesively secured to a circular wooden disc 144, which is loosely held to bottom panel 14 of the main support frame by a single screw 146. Screw 146 extends through hole 148 in panel 14, and through washer 150, into the center of disc 144. The thickness of the pad, and the positions of the nylon feet are chosen so that, when the pad is uncompressed, its bottom surface 152 is below the plane of the bottoms of the nylons feets. However, when the main support frame is placed on a desk or table, pad 142 is compressed by the weight of the frame and the CAD components supported thereby, so that bottom surface 152 is aligned with the plane of the bottoms of the nylon feet. The pad is therefore in tight frictional contact with the table top, and prevents the main support frame from translational sliding. However, the main support frame can swivel about the axis of screw 146, with the nylon feet sliding in circular paths on the table top. Thus, the operator can easily swivel the entire workstation on the table top about a fixed vertical axis. No modifications or permanent connections need to be made to the table.

FIGS. 6–9 illustrate the versatility of the workstation.

Figure 6:
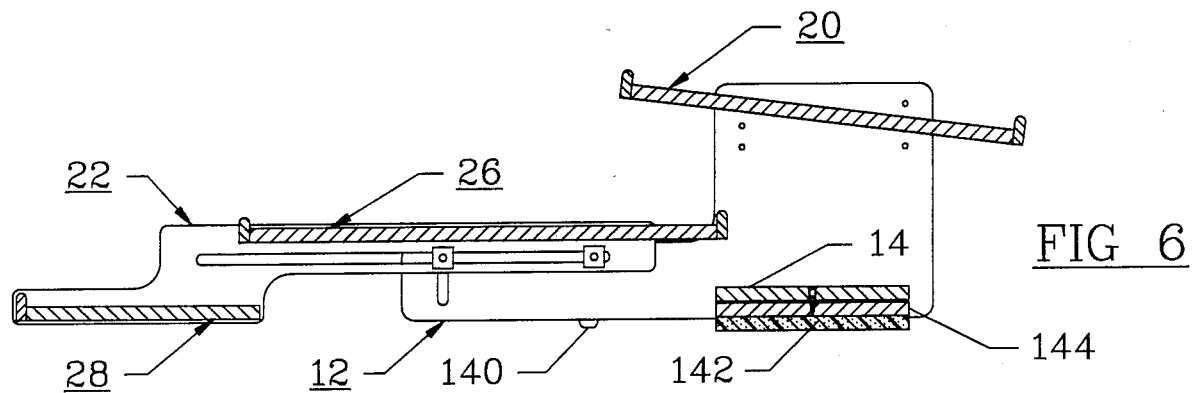
FIGS. 6, 7, 8 and 9 are sections taken on a vertical plane extending in the fore and aft direction through the workstation, illustrating various positions of the main support frame, secondary frame, monitor support, digitizer support and keyboard support.

In FIG. 6, the monitor support is tilted rearwardly to a position which would be appropriate when the operator is standing. The secondary frame is in its foremost position, and digitizer support 26 is at its rearmost position on the secondary frame so that keyboard support 28 is almost fully exposed.

Figure 7:
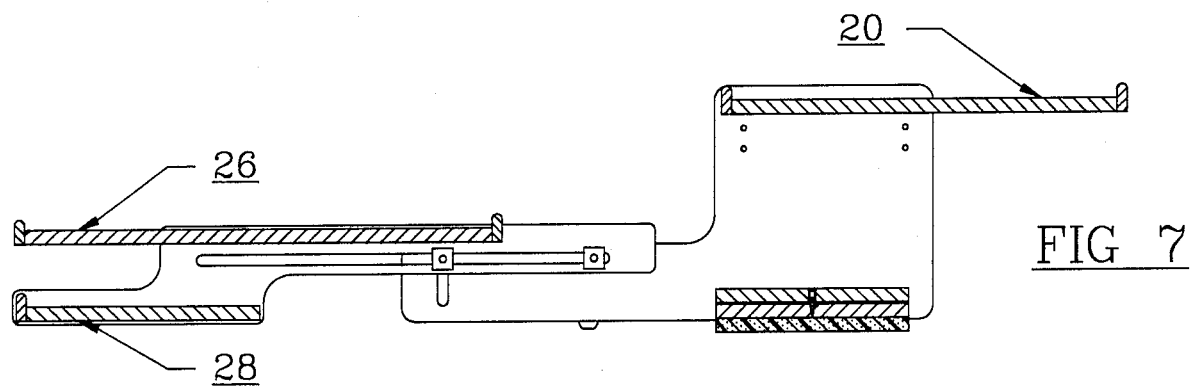
Figure 8:
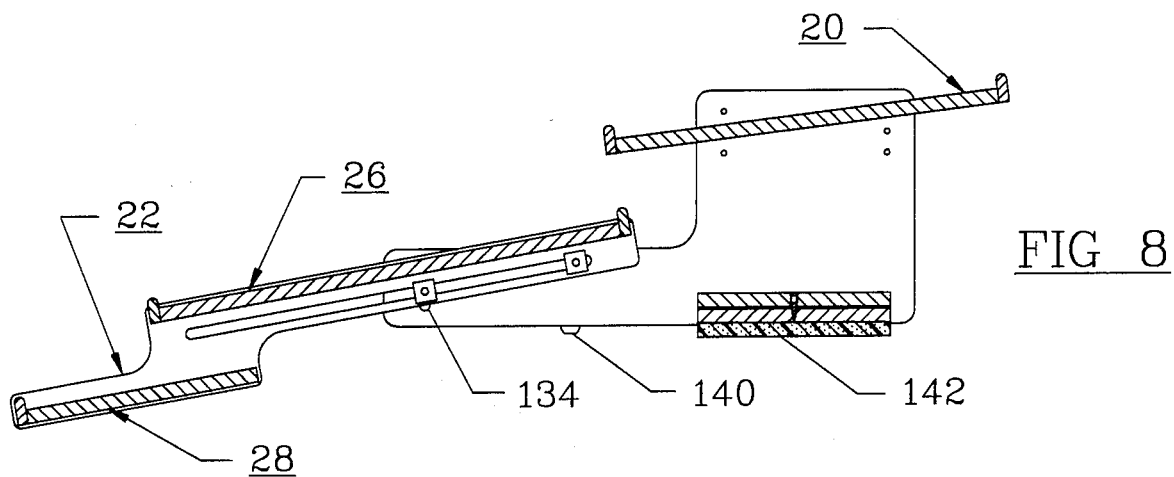

In FIG. 7, monitor support 20 is horizontal, and its rearmost position. The secondary frame is in its foremost position, but digitizing pad support 26 is forward so that keyboard support 28 is completely covered. This position would be appropriate when the keyboard is not being used, In FIG. 8, monitor support 20 is tilted forwardly, which would be appropriate when the operator is seated. The secondary frame is likewise tilted forwardly so that keyboard support 28 is below the table surface on which pad 142 and the feet (including foot 140) rest. The secondary frame is also in its foremost position, and digitizing pad support 26 is in an intermediate position on the secondary frame so that keyboard support 28 is partly covered. With the workstation configured as in FIG. 8, a seated operator can easily see the monitor screen, an reach and operate both the kayboard and the digitizing pad.

Figure 9:
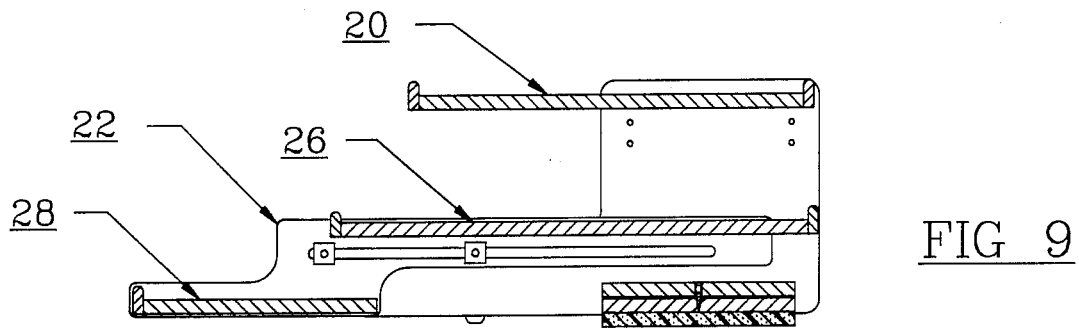

In FIG. 9, monitor support 20 is shown horizontal and in its foremost position. Digitizer support 26 is near its rearmost position on the secondary frame, and the secondary frame itself is in its rearmost position on the main support frame. The secondary support frame is not tilted downwardly, and the bottom of the keyboard support is above the table level. Keyboard support 28 is almost completely exposed. The position of the elements in FIG. 9 is appropriate when the workstation is not in use, and is also appropriate when only the keyboard is being used for data entry.

The workstation just described can be made from various materials, including wood, particle board, metal and synthetic polymers. In the specific apparatus shown in FIG. 3, panels 42, 78 and 96, and their front and rear edge trim strips are wooden, with aluminum extrusions on the left and right side edges of panels 42 and 78. Panel 14 is also preferably wood, as are the side panels of the main support frame and the secondary frame. The side panels, and panels 42 and 78 can be made from particle board. However, panels 14 and 28, which are secured by load-bearing wood screws in their edges, should be made of wood, rather than particle board.

The workstation can be modified in many respects. For example, in some cases it is desirable to accommodate two monitors, without increasing the distance between the side panels of the main support frame. This can be achieved by mounting a wide monitor support panel above, rather than between, the side panels of the main support frame. Another possible modification is to widen the digitizing pad support. This can be accomplished without impairing the ability of the secondary support frame to tilt forwardly, if the height of the side panels of the secondary support frame is increased slightly, and the horizontal legs of the side panels of the main support frame are trimmed so that they do not interfere with the digitizing pad support when it is tilted forwardly. Many of the advantages of the invention can be realized in a "floor model", in which the side panels of the main support frame are fixed to, or adjustably connected to, legs, which extend upwardly from a base.

Various other modifications can be made to the invention without departing from the scope of the invention as defined in the following claims.

I claim:

1. A computer workstation for computer-aided design using a computer, a monitor, a keyboard and a digitizer pad comprising:

a main support frame;

a monitor supporting means;

means for connecting the monitor supporting means to the main support frame and allowing and limiting adjustment of the position of the monitor supporting means relative to the main support frame in fore and aft directions;

digitizer pad supporting means having a pad supporting surface;

keyboard supporting means having a keyboard supporting surface; and secondary frame means for connecting said digitizer pad supporting means and said keyboard supporting means together with the keyboard supporting surface below the level of the lowermost part of the pad supporting surface;

in which the main support frame comprises two side panels arranged in opposed, parallel, spaced relationship to each other, said side panels having base means adapted to rest on a horizontal support surface;

in which the secondary frame means comprises two side panels, one of the side panels of the secondary frame means being situated parallel and adjacent to one of the side panels of the main support frame and the other of the side panels of the secondary frame means being situated parallel and adjacent to the other of the side panels of the main support frame;

each of said side panels of the secondary frame having an elongated slot; and each of the side panels of the main support frame having a least one vertically elongated slot;

locking pin means, extending through said vertically elongated slots of the side panels of the main support frame and through the elongated slots of the side panels of the secondary frame means, for locking said panels in fixed relationships to each other, said pin means being movable to positions in said vertically elongated slots at a height allowing the keyboard supporting surface to be located below the level of the bottom of the base means, and said pin means being movable to positions in said vertically elongated slots at a height allowing the slots of the side panels of the secondary frame means to slide on the pin means in said fore and aft directions with the keyboard supporting means being located entirely above the level of the bottom of the base means and with the elongated slot in each side panel of the secondary frame being substantially horizontal.

2. A computer workstation according to claim 1 in which the means for connecting the monitor supporting means to the main support frame also includes means for allowing and limiting tilting of the monitor supporting means about a horizontal axis perpendicular to the fore and aft directions.

3. A computer workstation according to claim 2 in which the monitor supporting means comprises a monitor support surface, and the means for allowing and limiting tilting of the monitor supporting means allows both forward and rearward tilting of the monitor supporting means, whereby the monitor support surface can be adjusted to face in an upward and rearward direction and can also be adjusted to face in an upward and forward direction.

4. A computer workstation for computer-aided design using a computer, a monitor, a keyboard and a digitizer pad comprising:

a main support frame;

a monitor supporting means;

means for connecting the monitor supporting means to the main support frame and allowing and limiting adjustment of the position of the monitor supporting means relative to the main support frame in fore and aft directions;

digitizer pad supporting means having a pad supporting surface;

keyboard supporting means having a keyboard supporting surface;

secondary frame means for connecting said digitizer pad supportin means and said keyboard supporting means together with the keyboard supporting surface below the level of the lowermost part of the pad supporting surface; and means for connecting the secondary frame means to the main support frame, allowing and limiting adjustment of the secondary frame means relative to the main support frame in fore and aft directions and allowing and limiting tilting of the secondary frame means about a horizontal axis perpendicular to the fore and aft directions;

in which the secondary frame means includes means for allowing and limiting fore and aft relative sliding movement of the digitizer pad supporting means and the keyboard supporting means.

5. A computer workstation according to claim 4 in which said means for allowing the limiting fore and aft relative sliding movement, allows the keyboard support means to be positioned substantially entirely underneath the digitizer pad supporting means and also allows the keyboard support means to be positioned substantially entirely forward of the foremost part of the digitizer pad supporting means.

6. A computer workstation for computer-aided design using a computer, a monitor, a keyboard and a digitizer pad comprising:

a main support frame;

a monitor supporting means;

means for connecting the monitor supporting means to the main support frame and allowing and limiting adjustment of the position of the monitor supporting means relative to the main support frame in fore and aft directions;

digitizer pad supporting means having a pad supporting surface;

keyboard supporting means having a keyboard supporting surface;

secondary frame means for connecting said digitizer pad supporting means and said keyboard supporting means together with the keyboard supporting surface below the level of the lowermost part of the pad supporting surface; and means for connecting the secondary frame means to the main support frame, allowing and limiting adjustment of the secondary frame means relative to the main support frame in fore and aft directions and allowing and limiting tilting of the secondary frame means about a horizontal axis perpendicular to the fore and aft directions;

in which the main support frame has a plurality of feet, all having hard surfaces adapted to glide on a table top, said hard surfaces of the feet being coplanar, a supporting pad adapted to engage a table top frictionally while said feet are in contact with the same table top, and swivel means attaching the supporting pad to the main support frame.

7. A computer workstation for computer-aided design using a computer, a monitor, a keyboard and a digitizer pad comprising:

a main support frame;

a monitor supporting means;

means for connecting the monitor supporting means to the main support frame and allowing and limiting adjustment of the position of the monitor supporting means relative to the main support frame in fore and aft directions;

digitizer pad supporting means having a pad supporting surface;

keyboard supporting means having a keyboard supporting surface;

secondary frame means for connecting said digitizer pad supporting means and said keyboard supporting means together with the keyboard supporting surface below the level of the lowermost part of the pad supporting surface; and means for connecting the secondary frame means to the main support frame, allowing and limiting adjustment of the secondary frame means relative to the main support frame in fore and aft directions and allowing and limiting tilting of the secondary frame means about a horizontal axis perpendicular to the fore and aft directions;

in which the main support frame has a plurality of feet all having hard surfaces adapted to glide on a table top, said hard surfaces of the feet being coplanar, and having pad means, and swivel means attaching the pad means to the main support frame, the pad means having a horizontal, planar underside surface adapted to engage a table top frictionally and the pad means being positioned so that, when uncompressed its underside is below the plane of said hard surfaces of the feet, and being compressible so that its underside is coplanar with the plane of said hard surfaces of the feet.

* * * * *